United States Patent
Watanabe et al.

(10) Patent No.: US 7,899,216 B2
(45) Date of Patent: Mar. 1, 2011

(54) BIOMETRIC INFORMATION PROCESSING APPARATUS AND BIOMETRIC INFORMATION PROCESSING METHOD

(75) Inventors: Keisuke Watanabe, Mizuho (JP); Tatsuya Masuda, Gunma (JP); Tatsushi Ohyama, Ogaki (JP); Hirofumi Saitoh, Ogaki (JP); Yasunari Takasaki, Gifu (JP); Masaya Okumura, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 1137 days.

(21) Appl. No.: 11/377,652

(22) Filed: Mar. 17, 2006

(65) Prior Publication Data
US 2006/0239514 A1    Oct. 26, 2006

(30) Foreign Application Priority Data

Mar. 18, 2005  (JP)  ............................. 2005-079020
Mar. 29, 2005  (JP)  ............................. 2005-095826

(51) Int. Cl.
G06K 9/00 (2006.01)
(52) U.S. Cl. ........................................ 382/115; 382/124
(58) Field of Classification Search .................... None
See application file for complete search history.

(56) References Cited

U.S. PATENT DOCUMENTS

2003/0126448 A1 * 7/2003 Russo ........................ 713/186

FOREIGN PATENT DOCUMENTS

| JP | 2001-155137 | | 6/2001 |
| JP | 2001155137 A | * | 6/2001 |
| JP | 2003-259116 | | 9/2003 |

* cited by examiner

Primary Examiner—Samir A Ahmed
Assistant Examiner—Fred Hu
(74) Attorney, Agent, or Firm—McDermott Will & Emery LLP

(57) ABSTRACT

In order to acquire a suitable fingerprint image by correcting an elongated fingerprint image, a line sensor acquires fingerprint image as a plurality of line-shaped images. A computation unit computes a similarity value by use of an evaluation function for evaluating the degree of similarity between the line-shaped images. The similarity value represents the degree of similarity between a first line-shaped image and a second line-shaped image which serve as a similarity evaluation target and are included in the plurality of the line-shaped image. A compression unit compresses the first line-shaped image and the second line-shaped image when the similarity value is equal to or larger than a predetermined threshold value to generate a new line-shaped image. A generation unit generates the entire fingerprint image by combining the new line-shaped image with the other line-shaped images.

15 Claims, 15 Drawing Sheets

BIOMETRIC INFORMATION PROCESSING APPARATUS AND BIOMETRIC INFORMATION PROCESSING METHOD

BACKGROUND OF THE INVENTION

1. Field of the Invention

The present invention relates to a technique for personal authentication by use of biometric information.

2. Description of the Related Art

A technique for personal authentication by use of biometric information has become widespread. There has been a demand that even a small portable device be provided with a function for acquiring biometric information. A line sensor is an example of a unit having such a function. For example, in a fingerprint authentication technique, a line sensor acquires an image of a fingerprint of a finger moving on the sensor as a plurality of line-shaped images. The entire fingerprint image can be generated by combining the plurality of line-shaped images acquired by the line sensor. A line sensor has a smaller sensor area as compared to a sensor capturing an entire fingerprint image at a time, thereby enabling space-saving upon mounting on a small portable device (see, for example, Japanese Patent Laid-Open Publications Nos. 2001-155137 and 2003-259116)

However, a line sensor generally captures a large number of line-shaped images per unit time. Thus, when the moving speed of a finger is slow, the sensor captures multiple images of a portion of a fingerprint. Therefore, if the captured line-shaped images are combined without being processed, the combined image is caused to be elongated.

SUMMARY OF THE INVENTION

The present invention has been made in view of the above circumstances, and it is an object of the present invention to suitably acquire biometric information by use of a plurality of line-shaped images.

One of the aspects of the present invention relates to a biometric information processing apparatus. The biometric information processing apparatus comprises an image acquisition unit, a similarity value calculation unit, a compression unit, and a generation unit. The image acquisition unit acquires a plurality of line-shaped images of a predetermined human body part by mean of a sweep-type sensor for identifying individuals. The similarity value calculation unit calculates a similarity value of a similarity evaluation target by use of an evaluation function for evaluating the similarity between the line-shaped images. The similarity evaluation target contains a first line-shaped image and a second line-shaped image out of the plurality of the line-shaped images, and the similarity value represents a degree of similarity between the first line-shaped image and the second line-shaped image. The compression unit compresses the first line-shaped image and the second line-shaped image when the similarity value is equal to or larger than a predetermined threshold value to thereby generate a new line-shaped image. The generation unit combines the newly generated line-shaped image with the other line-shaped images to thereby generate an image of the human body part.

In the biometric information processing apparatus, a similarity determination is made for a plurality of line-shaped images of a human body part acquired by the sweep-type sensor. When the line-shaped images are determined to be similar to each other, these line-shaped images are compressed to generate a new line-shaped image. Therefore, an image elongated as a whole can be corrected to obtain a suitable image.

Incidentally, any combinations of the foregoing components, and the expressions of the present invention mutually replaced with methods, apparatuses, systems, computer programs, recording media, and the like are also intended to constitute applicable aspects of the present invention.

DETAILED DESCRIPTION OF THE INVENTION

First Embodiment

A first embodiment relates to an apparatus for personal authentication by use of biometric information.

Generally, a technique for personal authentication by use of biometric information has been applied to compact devices such as a cellular phone. For example, in a technique for personal authentication by use of an image related to biometric information, it is desirable that a sensor, such as a line sensor, having a small installation area be mounted for acquiring the image. A line sensor acquires a fingerprint image as a plurality of strip-like images (also denoted as "line-shaped images"). The entire fingerprint image can be generated by combining the plurality of the strip-like images. A line sensor acquires a large number of line-shaped fingerprint images per unit time. Thus, if the moving speed of a finger is slow, the sensor acquires overlapping line-shaped images. Consequently, if all the acquired line-shaped images are combined, the combined image is caused to be elongated. In this case, a method may be conceivable in which the elongation is corrected by mounting a position sensor or a speed sensor on a compact device so as to eliminate the difference between an image capturing speed of the line sensor and the moving speed of a finger. However, if a line sensor or a speed sensor is mounted, the installation area therefor must be provided. Therefore, this method is not preferable in respect of an application of a biometric authentication technique to a compact device.

In the biometric information processing apparatus according to the first embodiment, the elongation is corrected by use of only the information of the line-shaped images acquired by a line sensor. Thus, since a position sensor or a speed sensor is not necessarily employed, the installation area can be reduced. In the first embodiment, a description is given for personal authentication by use of a fingerprint image. Specifically, the degree of similarity between the line-shaped fingerprint images is determined, and the line-shaped images determined to be similar to each other are compressed to generate a new line-shaped image. Then, the newly generated line-shaped image is combined with the other line-shaped images to thereby acquire an elongation-corrected fingerprint image. As used herein, the term "overlapping" does not always refer to that the images agree with each other and may refer to that the degree of similarity exceeds a predetermined criterion. Further, as used herein, the term "combining images" may refer to that a plurality of images are connected without overlapping or may refer to that a plurality of images are connected with portions thereof overlapping each other.

Figure 1:
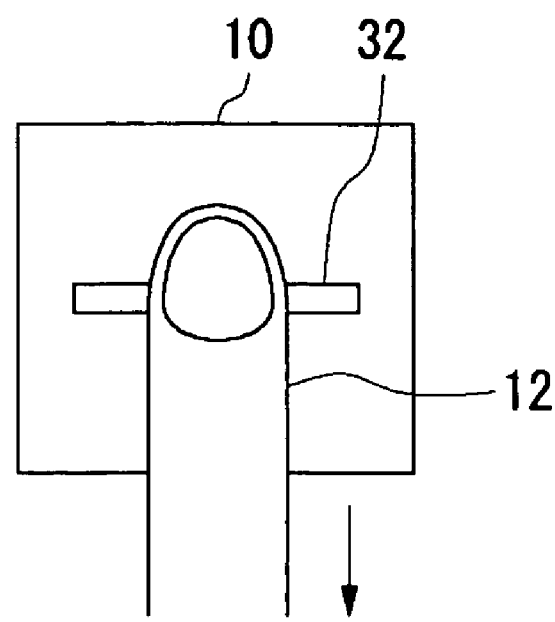
FIG. 1 is an illustration for describing the acquisition of a fingerprint image by means of a biometric information processing apparatus of a first embodiment.

FIG. 1 is an illustration for describing the acquisition of a fingerprint image by means of the biometric information processing apparatus in accordance with the first embodiment. The biometric information processing apparatus 10 comprises a line sensor 32. The line sensor 32 has an elongated rectangular shape and acquires a fingerprint image as a plurality of line-shaped images. As shown in FIG. 1, in order to acquire the line-shaped images of a fingerprint, a finger 12 of a user is allowed to move in a sliding manner on the line sensor 32 in the direction shown by the arrow which is orthogonal to the longer direction of the sensor 32. The line sensor 32 captures images of a fingerprint on the line sensor 32 while the finger 12 is allowed to move on the line sensor 32 and acquires the fingerprint image as a plurality of line-shaped images.

Figure 2:
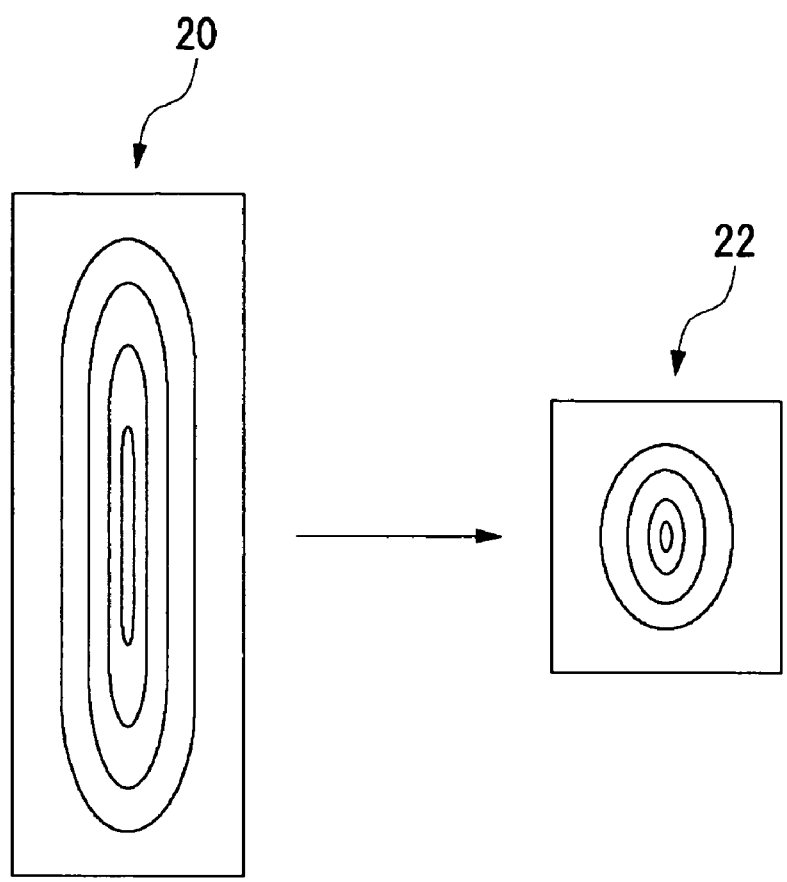
FIG. 2 is an illustration showing a fingerprint image generated by means of the biometric information processing apparatus of the first embodiment.

FIG. 2 is an illustration showing a fingerprint image generated by combining the acquired line-shaped images. Since the line sensor 32 acquires line-shaped images at a fast rate, multiple line-shaped images are acquired for the same portion of the fingerprint. Therefore, if a plurality of the line-shaped images acquired by the line-sensor 32 are combined without being processed, an elongated image 20 shown in FIG. 2 may result. In the biometric information processing apparatus according to the first embodiment, the overlapping line-shaped images can be compressed to acquire a non-elongated image 22.

Figure 3:
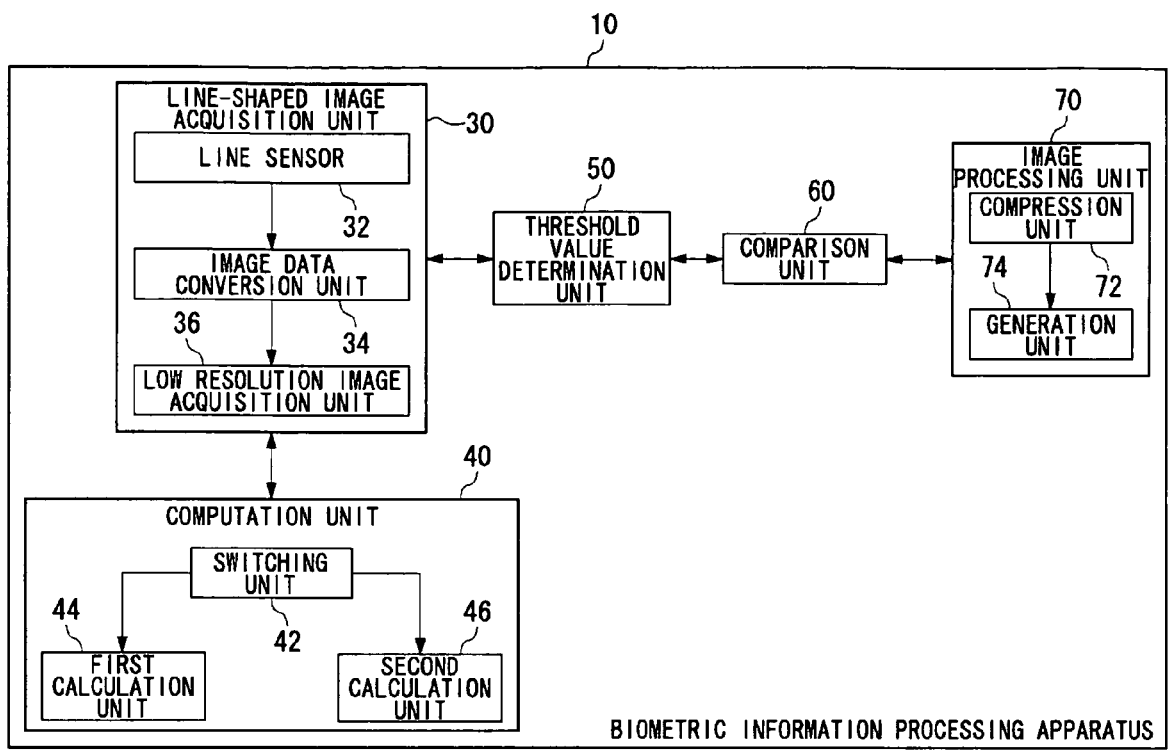
FIG. 3 is a function block diagram of the biometric information processing apparatus of the first embodiment.

FIG. 3 is a function block diagram of the biometric information processing apparatus of the first embodiment. Each of the blocks shown in the figure can be realized, in terms of hardware, by various components such as a processor, a RAM and various devices such as a sensor, or, in terms of software, by a computer program and the like. However, FIG. 3 illustrates the function blocks realized by cooperation of hardware and software. Therefore, it will be understood by a person skilled in the art that the function blocks can be realized in various forms by use of a combination of hardware and software.

The biometric information processing apparatus 10 comprises a line-shaped image acquisition unit 30, a computation unit 40, a threshold value determination unit 50, a comparison unit 60, and an image processing unit 70. The line-shaped image acquisition unit 30 acquires a plurality of line-shaped images of a fingerprint. The computation unit 40 computes the degree of similarity between two line-shaped images among the plurality of line-shaped images as a similarity value by use of the data of the line-shaped image acquired by the line-shaped image acquisition unit 30. The threshold value determination unit 50 determines, by use of the data of the line-shaped image acquired by the line-shaped image acquisition unit 30, a threshold value employed in the comparison unit 60 as a criterion for determining whether or not the line-shaped images are similar to each other. The comparison unit 60 compares the similarity value computed by the computational unit 40 with the threshold value determined by the threshold value determination unit 50 and determines whether or not the similarity value is equal to or larger than the threshold value. In other words, the comparison unit 60 determines whether or not the two line-shaped images are similar to each other. The image processing unit 70 compresses the line-shaped images if the comparison unit 60 has determined that the similarity value is equal to or larger than the threshold value. The image processing unit 70 then combines the compressed image with the other line-shaped images to generate a non-elongated fingerprint image.

As shown in FIG. 3, the line-shaped image acquisition unit 30 comprises a line sensor 32, an image data conversion unit 34, and a low resolution image acquisition unit 36. The line sensor 32 captures an image of the fingerprint of the finger 12 moving on the sensor 32 and acquires the fingerprint image as a plurality of line-shaped images. The image data conversion unit 34 binarizes the line-shaped images acquired by the line sensor 32 to generate data with two gradation levels of black and white. For computing the similarity value and the threshold value, the low resolution image acquisition unit 36 acquires a low resolution line-shaped image generated by reducing the resolution of the line-shaped image binarized by the image data conversion unit 34.

As shown in FIG. 3, the computation unit 40 comprises a switching unit 42, a first calculation unit 44, and a second calculation unit 46. Both the first calculation unit 44 and the second calculation unit 46 calculate by means of respective different methods the similarity value by use of a plurality of the low resolution line-shaped images acquired by the low resolution image acquisition unit 36. The switching unit 42 selects one of the first calculation unit 44 and the second calculation unit 46. In other words, the similarity value is calculated by means of one of the following methods: a method for calculating the similarity value by the first calculation unit 44 (also denoted as a "first method"); and a method for calculating the similarity value by the second calculation unit 46 (also denoted as a "second method"). Here, a user can determine which of the first and second methods to be selected. The first calculation unit 44 and the second calculation unit 46 will be described later with reference to FIGS. 4 and 5.

As shown in FIG. 3, the image processing unit 70 comprises a compression unit 72 and a generation unit 74. The compression unit 72 compresses the two line-shaped images which have been determined to be similar to each other by the comparison unit 60. The generation unit 74 generates the entire non-elongated fingerprint image by combining the line-shaped image compressed by the compression unit 72 and non-compressed line-shaped images.

Figure 4:
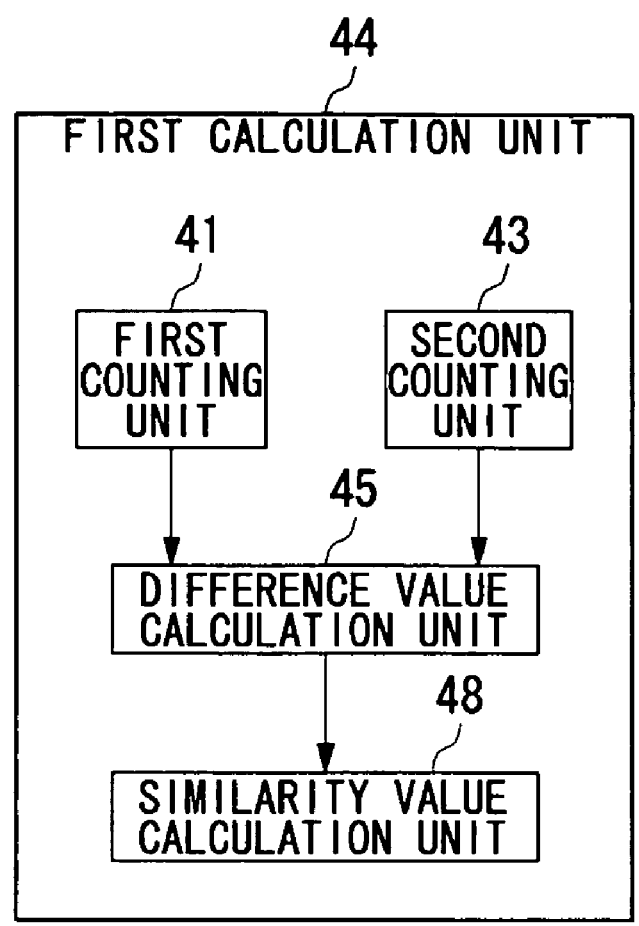
FIG. 4 is a function block diagram of a first calculation unit of the first embodiment.

FIG. 4 is a function block diagram of the first calculation unit. The first calculation unit 44 comprises a first counting unit 41, a second counting unit 43, a difference value calculation unit 45, and a similarity value calculation unit 48. Hereinafter, of adjacent two line-shaped images contained in a plurality of line-shaped images, a line-shaped image employed as a reference image for determining whether or not the images are similar to each other is referred to as a first line-shaped image. In this case, a line-shaped image employed for comparing with the first line-shaped image is referred to as a second line-shaped image. The first counting unit 41 counts the number of locations where white and black are adjacent to each other in the first line-shaped image (the number is also denoted as a "first inversion number"). Also, the second counting unit 43 counts the number of locations where white and black are adjacent to each other in the second line-shaped image (the number is also denoted as a "second inversion number").

Figure 6:
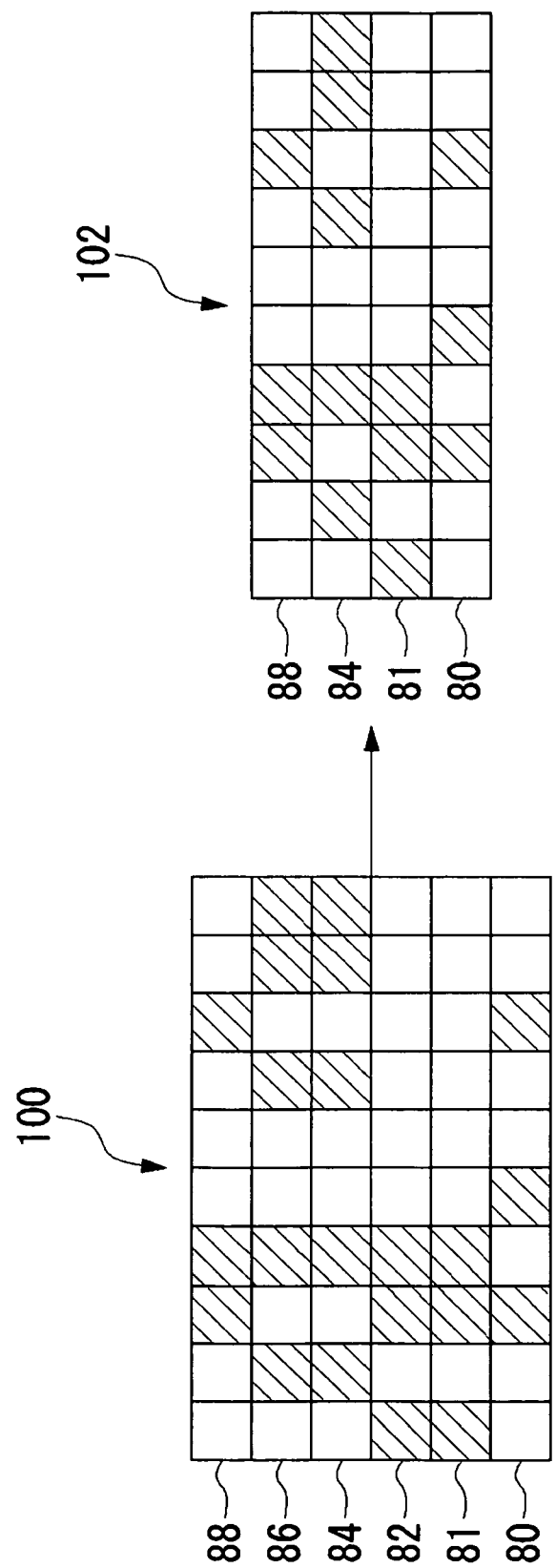
FIG. 6 is an illustration for describing compression processing through discard in the first embodiment.

The number of locations where white and black are adjacent to each other in an acquired image 100 shown in FIG. 6 is denoted as a "white-black inversion number." For example, the white-black inversion numbers of line-shaped images 80, 81, 82, 84, 86, and 88 included in the acquired image 100 are 6, 3, 3, 7, 7, and 4, respectively. The difference value calculation unit 45 calculates the difference value between the first inversion number and the second inversion number. The smaller the difference value, the larger the degree of similarity between the first line-shaped image and the second line-shaped image. The similarity value calculation unit 48 calculates the similarity value defined such that the smaller the difference value between the first and second inversion numbers the larger the similarity value. If the difference value is given, for example, as $\alpha$, the similarity value is defined as $1/(1+\alpha)$. The calculation of the similarity value will be described using FIG. 6. For the line-shaped images 80 and 81 in the image 100, if the line-shaped image 80 serves as the first line-shaped image, the line-shaped image 81 serves as the second line-shaped image. In this case, since the first inversion number is 6 and the second inversion number is 3, the difference value is 3. Therefore, the similarity value calculation unit 48 gives 0.25 as the calculated similarity value. Also, for the line-shaped images 81 and 82, if the line-shaped image 81 serves as the first line-shaped image, the line-shaped image 82 serves as the second line-shaped image. In this case, since the first inversion number is 3 and the second inversion number is also 3, the difference value is 0. Therefore, the similarity value calculation unit 48 gives 1 as the calculated similarity value.

Figure 5:
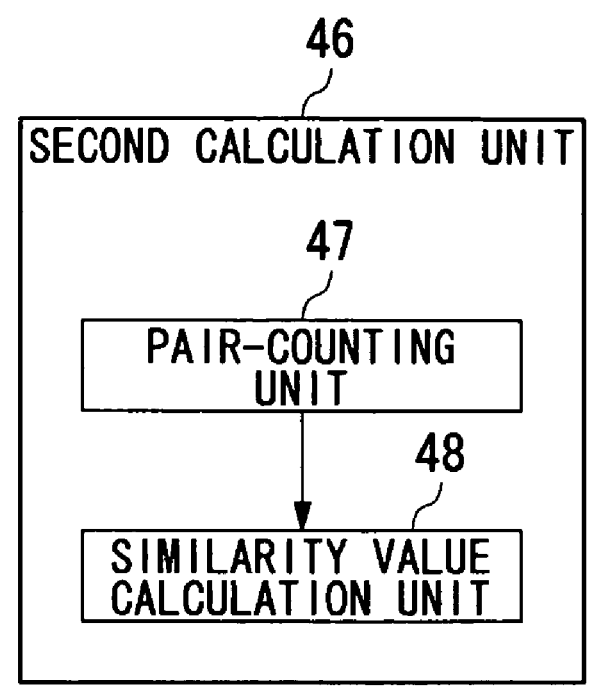
FIG. 5 is a function block diagram of a second calculation unit of the first embodiment.
Figure 7:
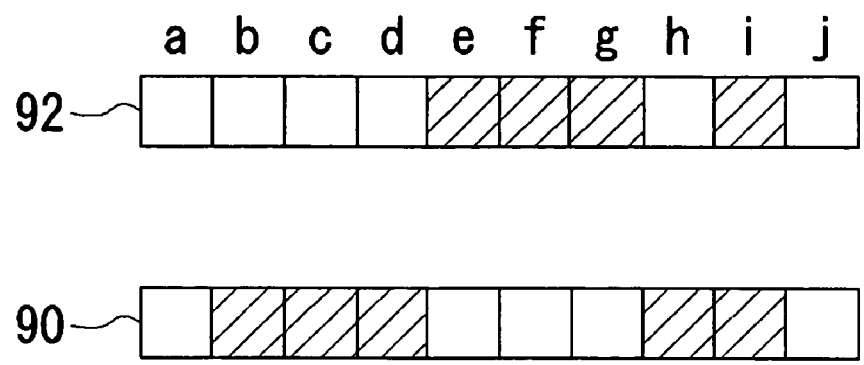
FIG. 7 is an illustration for describing the calculation of a similarity value in a second method of the first embodiment.

FIG. 5 is a function block diagram of the second calculation unit. The second calculation unit 46 comprises a pair-counting unit 47 and a similarity value calculation unit 48. Among a plurality of the low resolution line-shaped images acquired by the low resolution image acquisition unit 36, the images under the determination of similarity are referred to as the first line-shaped image and the second line-shaped image, as described above. The pair-counting unit 47 compares the gradation levels of the block areas in correspondence with each other in the first and second line-shaped images. The pair-counting unit 47 then counts the number of pairs of the block areas having different gradation levels. The smaller the number of pairs counted by the pair-counting unit 47, the smaller the difference between the first and second line-shaped images, that is, the larger the degree of similarity between these line-shaped images. The similarity value calculation unit 48 calculates the similarity value defined such that the smaller the number of pairs counted by the pair-counting unit 47 the larger the similarity value. If the number of pairs counted by the pair-counting unit 47 is given, for example, as $\beta$, the similarity value is defined as $1/(1+\beta)$. As an example, the calculation of the similarity value will be described with reference to a first line-shaped image 90 and a second line-shaped image 92 each formed of ten block areas aligned in one direction, as shown in FIG. 7. The pair-counting unit 47 determines whether or not the gradation levels are different for ten pairs including pairs a, b, c, d, e, f, g, h, i, and j. In FIG. 7, among the ten pairs a to j, the gradation levels are different in seven pairs including the pairs b, c, d, e, f, g, and h, and thus the value counted by pair-counting unit 47 is 7. Thus, the similarity value calculation unit 48 gives 0.125 as the calculated similarity value.

In the second calculation unit 46, pairs of block areas positioned adjacent to the boundary between white and black in either of the first and second line-shaped images may be excluded from the counting by the pair-counting unit 47. Some line-shaped images may contain block areas to which an incorrect gradation level is assigned due to displacement of a finger. However, in the above manner, the information of such line-shaped images can be reduced in the calculation of the similarity value by the similarity value calculation unit 48. Specifically, when a finger is allowed to move on the line sensor 32, the finger may be displaced in the lateral direction with respect to the line sensor. If the displacement of the finger occurs, for example, black may be assigned to a block area to which white should be assigned if the displacement of the finger does not occur. Particularly, the boundary region between a white block area and a black block area is likely to be affected by the displacement of a finger. If pairs containing a block area located adjacent to the boundary between a white block area and a black block area in an acquired line-shaped image are excluded from the counting by the pair-counting unit 47 in advance, the similarity value can be calculated more accurately.

For example, in a first line-shaped image 90 shown in FIG. 7, block areas a, b, d, e, g, h, i, and j are located adjacent to the boundary between block areas having different gradation levels or the boundary between a white block area and a black block area. Also, in a second line-shaped image 92, block areas d, e, g, h, i, and j are located adjacent to the boundary between block areas having different gradation levels or the boundary between a white block area and a black block area. Therefore, in the second calculation unit 46, the pairs a, b, d, e, g, h, i, and j are excluded in advance from the determination made by the pair-counting unit 47 as to whether or not the gradation levels are different in each pair. That is, pairs c and f can serve as the target for the counting by the pair-counting unit 47, and the determination whether or not the gradation levels of block areas are different is made for these two pairs. As shown in FIG. 7, since the gradation levels of the block areas are different in both the pairs c and f, the pair-counting unit 47 gives 2 as the counted value. The similarity value calculation unit 48 calculates the similarity value based on the counted value (in this case, 2). Moreover, in the pair-counting unit 47, after the determination whether or not the gradation levels are different is first made for all the pairs, the pairs having a block area positioned at a location where different gradation levels are adjacent to each other may be excluded from the counting target.

The threshold value determination unit 50 determines, based on the white-black inversion number of the low resolution line-shaped image acquired by the low resolution image acquisition unit 36, the threshold value employed by the comparison unit 60 as a criterion for determining whether or not the line-shaped images are similar to each other. For example, since the central portion of the fingerprint of the finger 12 contains many features for identifying individuals, it is preferred that not many line-shaped images be discarded in the central portion even though the images are similar to each other. Since many ridges are present in the central portion of the fingerprint of the finger 12, the white-black inversion number is large in the line-shaped image of the central portion. Therefore, the threshold value determination unit 50 determines the threshold value such that the larger the white-black inversion number the larger the threshold value. In this manner, an image can be acquired in which features for identifying individuals are extracted more accurately.

In the first embodiment, the similarity value calculation unit 48 and the threshold value determination unit 50 calculate the similarity value and the threshold value, respectively, by use of the low resolution line-shaped image acquired by the low resolution image acquisition unit 36. However, the similarity value or the threshold value may be calculated by use of a line-shaped image having a resolution before the acquisition by the low resolution image acquisition unit 36 in accordance with need. For example, since the central portion of the fingerprint of the finger 12 contains many ridges, the white-black inversion number is large in the line-shaped image of the central portion. If the white-black inversion number is large, the similarity value or the threshold value can be obtained more accurately by counting the white-black inversion number by use of a line-shaped image before the resolution reduction in place of the low resolution line-shaped image.

In the first embodiment, the low resolution image acquisition unit 36 acquires the low resolution line-shaped image by use of the line-shaped image acquired by the line sensor 32. Here, after a line-shaped image is first acquired by the line sensor 32 and the resolution thereof is reduced by the low resolution image acquisition unit 36, the line-shaped image may be re-acquired by the line sensor 32.

The image processing unit 70 compresses similar line-shaped images. Specifically, if the first and second line-shaped images are similar to each other, the compression unit 72 discards the second line-shaped image. In this manner, the line-shaped images can be easily compressed without the need for complex computations. As an example, the image compression will be described with reference to the line-shaped images 80, 81, 82, 84, 86, and 88 included in the acquired image 100 shown in FIG. 6. For the line-shaped images 81 and 82, if the line-shaped image 81 serves as the first line-shaped image, the line-shaped image 82 serves as the second line-shaped image. In this case, when the similarity value between the line-shaped images 81 and 82 is equal to or larger than the threshold value, the line-shaped image 82 is discarded. Also, for the line-shaped images 84 and 86, if the line-shaped image 84 serves as the first line-shaped image, the line-shaped image 86 serves as the second line-shaped image. In this case, when the similarity value between the line-shaped images 84 and 86 is equal to or larger than the threshold value, the line-shaped image 86 is discarded. Subsequently, the generation unit 74 combines the resultant non-discarded line-shaped images 81 and 84 with the line-shaped images 80 and 88 which are excluded from the discard target since these images are not similar to the other images. Consequently, an image 102 formed of the line-shaped images 80, 81, 84, and 88 is obtained, as shown in FIG. 6. Here, when the first and second line-shaped images are similar to each other, the first line-shaped image may be discarded.

The compression of line-shaped images may be performed by mixing two similar line-shaped images. "Mixing" as used herein may be weighted-averaging of two similar line-shaped images by using a predetermined ratio. As an example, the weighted-averaging will be described when ten gradation levels are employed instead of the binarization as described above. In this case, the ten gradation levels are numbered from 1 to 10, and a gradation number is assigned to each of the block areas of a line-shaped image. First, in the two line-shaped images serving as the target of compression processing, the gradation number of one of the block areas in correspondence with each other is multiplied by a predetermined constant ranging from 0 to 1.0. Then, the gradation number of the other block area is multiplied by a value obtained by subtracting the predetermined constant from 1. The mixing is performed by adding the values obtained by the above calculations, selecting a gradation number closest to the added value, and assigning the selected gradation number to a block area of a line-shaped image to be newly generated.

For example, if the gradation number of one of the block areas in correspondence with each other is 8, the gradation number of the other is 2, and the predetermined constant is 0.7, then the gradation number of the one of the block areas, 8, is multiplied by 0.7 and the gradation number of the other, 2, is multiplied by 0.3. Subsequently, by adding the multiplied values, a calculated value of 6.2 is obtained. Then, a gradation number of 6 which is a number closest to 6.2 is assigned to a block area of a line-shaped image to be newly generated. A gradation number is determined by mixing for all the block areas in correspondence with each other, and a new line-shaped image is generated by assigning the determined gradation numbers to the respective block areas.

According to the mixing, a line-shaped image is newly generated by use of the information of both the two similar line-shaped images, and thus a fingerprint image can be acquired more accurately.

Further, if the mixing ratios for the two line-shaped images are the same, these images are averaged. The averaging as used herein is performed by employing 0.5 as the abovementioned predetermined constant and assigning a gradation number which is closest to the average value of the gradation numbers of the block areas in correspondence with each other. For example, if the gradation number of one of the block areas in correspondence with each other is 8, and the gradation number of the other is 2, then the average value of the gradation numbers is 5. Thus, a gradation number of 5 is assigned to a block area of a line-shaped image to be newly generated. A gradation number is determined by averaging for all the block areas in correspondence with each other, and a new line-shaped image is generated by assigning the determined gradation numbers to the respective block areas. In the averaging, the predetermined constant is always 0.5 in contrast to the abovedescribed mixing. Thus, since the calculation of multiplying the gradation numbers of the block areas in correspondence with each other by respective different values is unnecessary, the calculation for newly generating a line-shaped image is simplified.

A processing procedure of the biometric information processing apparatus 10 according to the first embodiment will be described.

Figure 8:
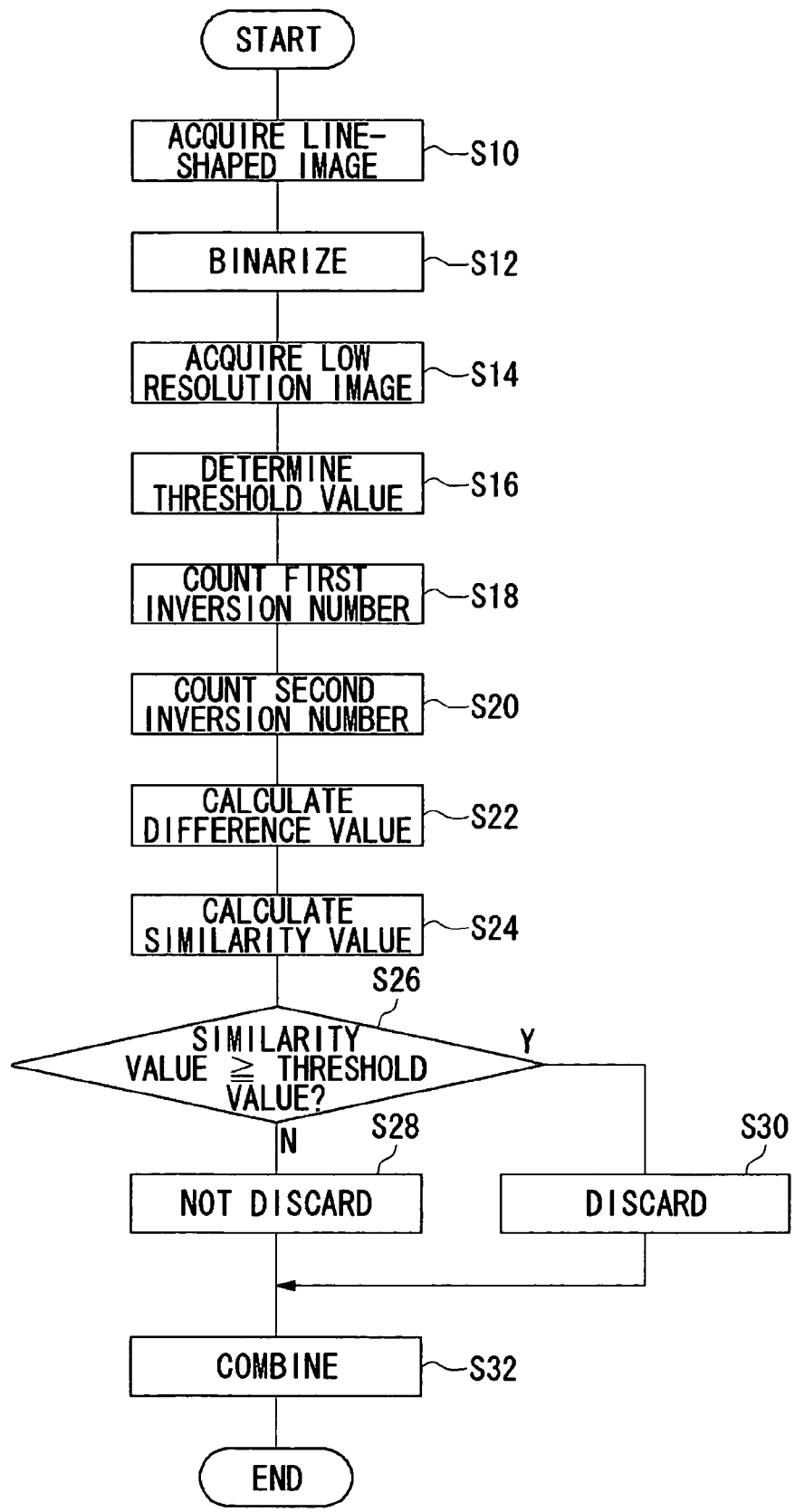
FIG. 8 is a flowchart for a processing procedure of the biometric information processing apparatus employing a first method of the first embodiment.

FIG. 8 is a flowchart for a processing procedure of the biometric information processing apparatus employing the first method. The line sensor 32 acquires a plurality of line-shaped images of a fingerprint (S10). The image data conversion unit 34 binarizes each of the line-shaped images (S12). The low resolution image acquisition unit 36 reduces the resolution of the binarized line-shaped image to acquire a low resolution line-shaped image having a resolution lower than that when the image is acquired by the line sensor (S14). The threshold value determination unit 50 determines, according to the white-black inversion number of the line-shaped image acquired by the low resolution image acquisition unit 36, a threshold value employed as a criterion for determining whether or not the similar line-shaped image is discarded (S16). The first calculation unit 41 counts the first inversion number of the first line-shaped image included in the line-shaped images acquired by the low resolution image acquisition unit 36 (S18). The second calculation unit 43 counts the second inversion number of the second line-shaped image included in the line-shaped images acquired by the low resolution image acquisition unit 36 (S20). The difference value calculation unit 45 calculates the difference value between the first inversion number and the second inversion number (S22). The similarity value calculation unit 48 calculates the similarity value according to the difference value between the first inversion number and the second inversion number (S24). The comparison unit 60 compares the threshold value with the similarity value (S26). If the similarity value is smaller than the threshold value (N in S26), the compression unit 72 does not discard a line-shaped image (S28). On the other hand, if the similarity value is equal to or larger than the threshold value (Y in S26), the compression unit 72 discard a line-shaped image (S30). The generation unit 74 combines line-shaped images which have been determined to have a similarity value less than the threshold value with non-discarded line-shaped images to generate a non-elongated fingerprint image (S32). The non-discarded line-shaped image is one of the first and second line-shaped images which have been determined to have a similarity value equal to or larger than the threshold value.

Figure 9:
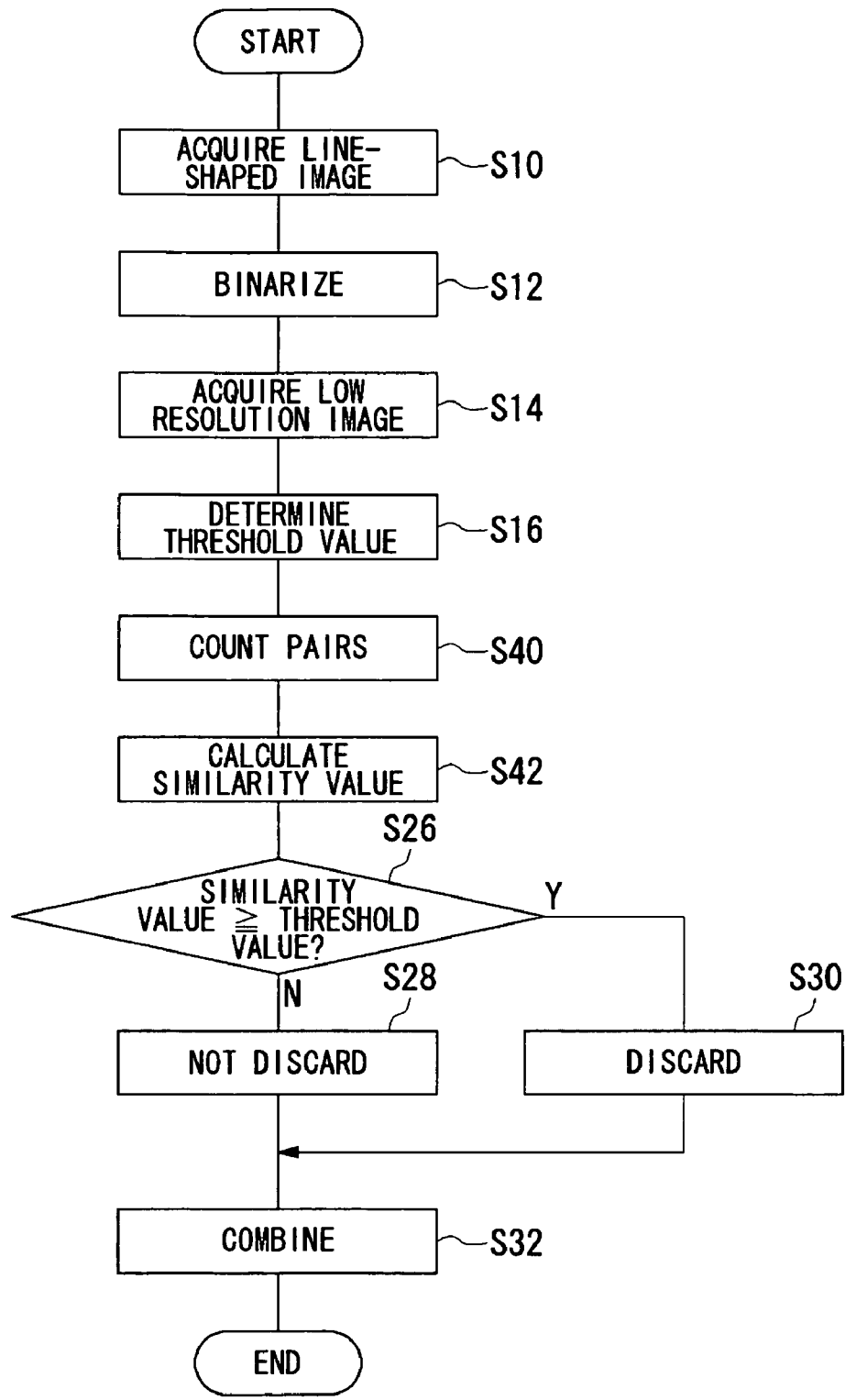
FIG. 9 is a flowchart for a processing procedure of the biometric information processing apparatus employing a second method of the first embodiment.

FIG. 9 is a flowchart for a processing procedure of the biometric information processing apparatus employing the second method. Here, the processing operations of steps S10 to S16 and S26 to S32 are the same as those shown in FIG. 8 with the same numerals. In FIG. 9, the pair-counting unit 47 counts the number of pairs of the block areas having different gradation levels in the first and second line-shaped images (S40). The similarity value calculation unit 48 calculates the similarity value according to the number of pairs counted by the pair-counting unit 47 (S42). The same processing as above shown in S26 to S32 is performed according to this similarity value.

In the first method of the first embodiment, the similarity value is calculated according to the white-black inversion number of one line-shaped image. On the other hand, in the second method, the similarity value is calculated according to the number of pairs of block areas which are in correspondence with each other in two line-shaped images and have different gradation levels. Therefore, according to the first embodiment, since overlapping line-shaped images are discarded by use of substantially only the information of the line-shaped images, a position sensor or a speed sensor is not required to be provided. Thus, when an apparatus for acquiring biometric information is mounted on a small device, the installation area can be reduced. Moreover, if at least two line-shaped images are acquired, the line-shaped images can be compressed by discarding one of them. Therefore, according to the first embodiment, the compression processing can be performed with less memory and at high speed.

In the first embodiment, the threshold value is determined according to the white-black inversion number of the line-shaped image. Thus, as compared to the case where the threshold value is a fixed value, an image can be acquired in which the features for identifying individuals are extracted more accurately. As described above, many ridges are present in a portion where the white-black inversion number is large, and thus such a portion often contains features for identifying individuals. If the threshold value is fixed, a line-shaped image is discarded by applying the same criterion to the portions with and also without the features in a fingerprint image. However, by determining the threshold value as in the first embodiment, not many line-shaped images are discarded in the portion with the features. For example, occasionally, some line-shaped images are not suitably acquired when a fingerprint is blurred or occluded due to drying or wetting of a finger. The white-black inversion number is small in a line-shaped image containing the blurred or occluded portion. In the first embodiment, the larger the white-black inversion number, the larger the threshold value. Also, the smaller the inversion number, the smaller the threshold value. Therefore, the line-shaped images in an unsuitably acquired portion tend to be discarded. On the other hand, the line-shaped images suitably acquired and having a large white-black inversion number tend not to be discarded. In this manner, even when a finger is dry or wet, an image can be acquired in which the features for identifying individuals are suitably extracted.

In the first embodiment, the similarity value is calculated by use of the low resolution line-shaped image acquired by the low resolution image acquisition unit 36, and also the threshold value is determined by use of the low resolution line-shaped image. In this manner, the load required for calculating the similarity value and for determining the threshold value is reduced. Therefore, the biometric information processing apparatus 10 can generate the entire non-elongated fingerprint image at a faster speed.

In the first embodiment, the example in which the line-shaped image is expressed by two gradation levels or white and black has been described. In a modified example, the line-shaped image may be expressed by three or more gradation levels.

In the first embodiment, the similarity value and the threshold value are calculated by use of the information of the entire line-shaped image. In a modified example, these values may be calculated by use of the information of a part of a line-shaped image. In this case, as compared to the case where the information of the entire line-shaped image is employed, the similarity value and the threshold value are calculated with less information, and thus the compression processing can be simplified.

In the first embodiment, the example in which a fingerprint image is acquired has been described. A modified example derived from the first embodiment is applicable to a technique for personal authentication by use of the information of an image of not only fingerprints but also palm prints, irises, veins, faces, retinas, and the like.

Second Embodiment

A second embodiment also relates to an apparatus for personal authentication by use of biometric information.

Methods for personal authentication can be broadly classified into three categories. One method is authentication by a possession such as a key or an ID card. However, in the authentication by a possession, security is threatened by loss and theft. Another method is authentication by knowledge such as a password. However, the authentication by knowledge also has security problems caused by forgetfulness, peeping, or the like. An authentication method which has been receiving attention in recent years is biometric authentication by use of biometric information such as fingerprints, palm prints, faces, irises, voice prints, and vein patterns. In biometric authentication, the security concerns due to "loss" associated with the abovementioned authentication by a possession or knowledge is considerably suppressed. Further, since a user is "not required to keep" any object or knowledge, an authentication system with high convenience is easily provided.

Due to such advantages, a personal authentication apparatus based on biometric information is expected to replace authentication by a possession such as a key for a house or a car. In recent years, electronic commerce has become increasingly widespread, and the authentication methods employed therein are often based on authentication by knowledge. Also in this field, the development of an authentication apparatus with high convenience and security has been awaited.

In order to enhance the convenience of a personal authentication apparatus based on biometric information, the biometric information must be acquired with high accuracy. Biometric information is often acquired as a biometric image of, for example, a fingerprint, a palm print, or a vein pattern. In the case of, for example, a fingerprint, a fingerprint image is converted into a quantized image by use of a predetermined threshold value serving as a boundary. Feature information including ridges, terminal points, and branch points of a fingerprint is inherent to individuals and is extracted from the quantized image.

However, fingerprints include clear fingerprints and unclear fingerprints. Also, the force of a finger pressing a sensor is not always constant. Therefore, a technique must be provided for ensuring suitable fingerprint image acquisition irrespective of fingerprint acquisition conditions. On the other hand, in order to reduce the processing load for processing fingerprint image data, the realization of a simple biometric image acquisition algorithm is also important.

The second embodiment has been made in view of the above circumstances, and it is an object of the second embodiment to provide a technique for suitably acquiring biometric information.

More specifically, the second embodiment relates to a biometric image acquisition apparatus.

This apparatus captures a plurality of partial images of a human body part such as a fingerprint and converts each of the partial images into a quantized image with a plurality of gradation levels. In this apparatus, a plurality of quantized images corresponding to positions in proximity to one another are mixed to form a smaller number of combined images, and the combined images generated for each part of the human body part are combined to generate the entire biometric image.

Preferably, the human body part is a part from which features inherent to individuals can be extracted as a biometric image, and examples of such a human body part include a fingerprint and a vein pattern. The threshold values employed when the partial images are converted into the quantized images may be different for each of the partial images. By generating the combined image from a plurality of the quantized images, the effects of the acquisition conditions of the image can be mitigated as compared to the case where a single quantized image is employed. Therefore, a suitable biometric image is easily acquired with a simple configuration.

Figure 10:
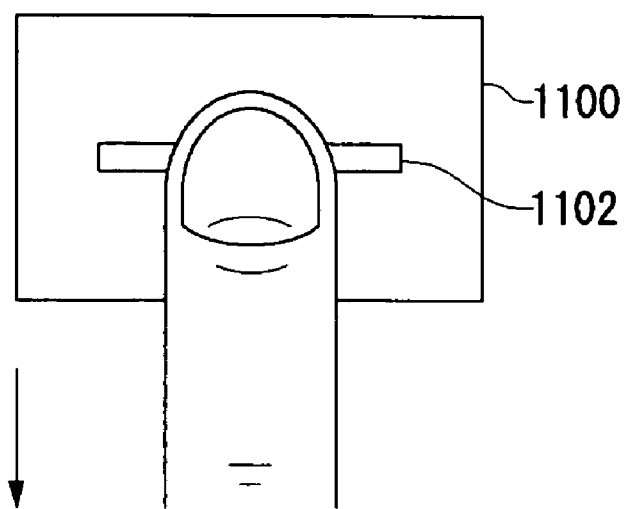
FIG. 10 is an illustration showing an aspect during the acquisition of a fingerprint by use of a personal authentication apparatus of a second embodiment.

FIG. 10 is an illustration showing an aspect during the acquisition of a fingerprint by use of a personal authentication apparatus. A user of the personal authentication apparatus 1100 places a finger on a detection unit 1102 and slides the finger in the downward direction shown by an arrow in FIG. 10. The detection unit 1102 serves as a so-called "line sensor." In the second embodiment, the detection unit 1102 is formed of optical sensors. The fingerprint is irradiated with light from the detection unit 1102, and a fingerprint image is acquired by detecting the reflection.

While the user slides the finger, fingerprint images are captured at sufficiently short intervals. For each image capturing event, each sensor acquires an image of a part of the fingerprint located just above the sensor (hereinafter, this image is referred to as a "partial image"). Since the detection unit 1102 has a line shape, the partial image also has a line shape. By connecting the thus-sampled partial images, the entire fingerprint image is acquired. In the captured fingerprint image, the ridge portions of the fingerprint are dark, and the valley portions are white.

The partial image is quantized by the personal authentication apparatus 1100 to form a binarized image. Hereinafter, the binarized partial image is referred to as a "quantized image." The lightness of pixels contained in the partial image is normalized in the range from 0.0 to 1.0. For each image block contained in the partial image, a determination is made whether or not the lightness thereof is equal to or larger than a predetermined threshold value (hereinafter, referred to as a "quantizing threshold value").

If an image block corresponds to a pixel, each of the image blocks of the partial image is binarized. In this case, if the lightness of the image block of the partial image is 0.5 or more, a gradation value of 1.0 is given to the image block of the quantized image. Also, if the lightness of the image block of the partial image is less than 0.5, a gradation value of 0.0 is given to the image block of the quantized image. In this manner, each of the image blocks of the quantized image has a gradation value of 0.0 (black) or 1.0 (white).

If an image block is composed of a plurality of pixels, the binarizing processing may be performed based on the average lightness of the pixels in the image block of the partial image. For example, the image block of the quantized image has a binarized gradation value of 1.0 if the average lightness of the image block of the partial image is 0.5 or more, or has a binarized gradation value of 0.0 if the average lightness is less than 0.5.

By connecting the binarized quantized images, a quantized image of the entire fingerprint is obtained. The personal authentication apparatus 1100 extracts the feature information inherent to individuals from the connected quantized image. The feature information includes the directions of ridges, the locations of terminal points and branch points of the fingerprint and is employed for fingerprint authentication.

The shade of a fingerprint image changes depending on the acquisition conditions of the fingerprint.

For example, for a dry finger, the fingerprint image tends to be a thin image in which the ridges are unclear. Hence, in order to obtain a quantized image in which the ridges of a fingerprint can be clearly distinguished, it is desirable that the quantizing threshold value be set to high. If the quantizing threshold value is set to low, white is likely to be assigned to a block upon quantization even when the block is relatively thick color. Thus, the entire portion of the quantized image becomes whitish to cause difficulty in the extraction of the features.

On the other hand, for a wet finger, the fingerprint image tends to be a dark image in which valleys are unclear. In such a case, it is desirable that the quantizing threshold value be set to low. If the quantizing threshold value is set to high, the number of the image blocks in which black is assigned upon quantization increases. Thus, the entire portion of the quantized image becomes blackish to also cause difficulty in the extraction of the feature information.

In order to address such problems, a method may be employed in which the quantizing threshold value is dynamically controlled according to the acquisition environment of a fingerprint. However, in this case, a circuit or software must be provided for feedback processing, causing the processing cost to tend to be high. The personal authentication apparatus 1100 of the second embodiment is an apparatus having a simple configuration and aiming to suitably acquire a fingerprint image by mitigating the effects of the acquisition conditions of a fingerprint.

Figure 11:
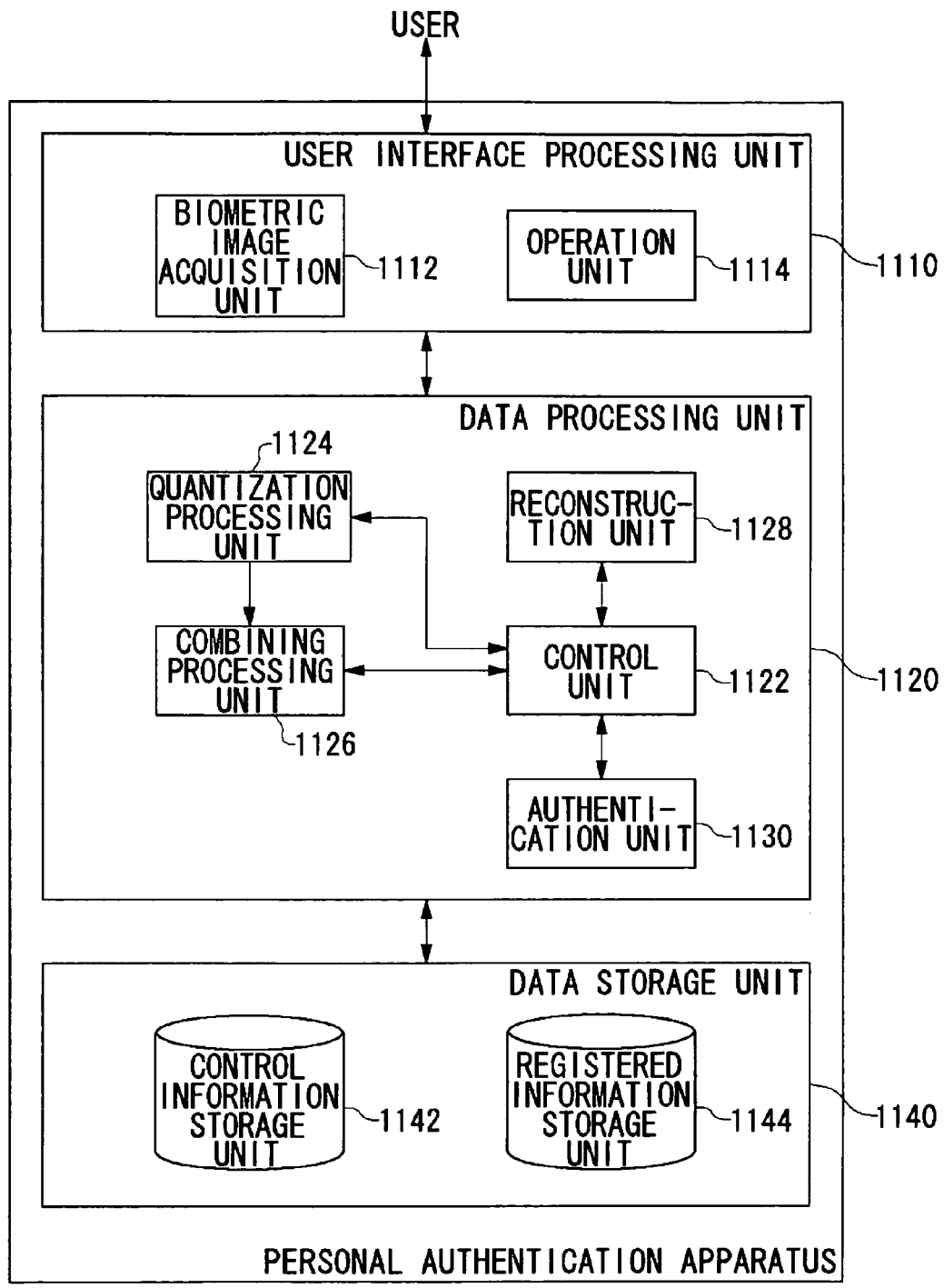
FIG. 11 is a function block diagram of the personal authentication apparatus of the second embodiment.

FIG. 11 is a function block diagram of the personal authentication apparatus.

Each of the blocks shown in the figure can be realized, in terms of hardware, by components such as a CPU of a computer and mechanical apparatus, or, in terms of software, by a computer program and the like. However, FIG. 11 illustrates the function blocks realized by cooperation of hardware and software. Therefore, it will be understood by a person skilled in the art that the function blocks can be realized in various forms by use of a combination of hardware and software.

Here, the function of each block will be described, and the specific action thereof will be described in conjunction with FIG. 12 and subsequent figures.

The personal authentication apparatus 1100 comprises a user interface processing unit 1110, a data processing unit 1120, and a data storage unit 1140.

The user interface processing unit 1110 takes charge of user interface processing. The data processing unit 1120 processes data to be stored in the data storage unit 1140 based on the fingerprint image data and operational instructions inputted via the user interface processing unit 1110.

The user interface processing unit 1110 comprises a biometric image acquisition unit 1112 and an operation unit 1114.

The biometric image acquisition unit 1112 acquires fingerprint information serving as biometric information from a user by means of the detection unit 1102. As has been described, the biometric image acquisition unit 1112 acquires the fingerprint image of the user as a plurality of partial images. The operation unit 1114 receives operations from the user. The operations as used herein may be, for example, an initiation instruction or a termination instruction of the biometric information acquisition. In addition to the above units, the user interface processing unit 1110 may be provided with a notification function for display or voice output of various types of information to the user. For example, the completion of the acquisition and authentication of biometric information may be notified to the user through an LED, a display, or voice.

The data storage unit 1140 comprises a control information storage unit 1142 and a registered information storage unit 1144.

The control information storage unit 1142 stores control information representing various control conditions such as the quantizing threshold value. The registered information storage unit 1144 stores the features of the fingerprint of a registered person as registered information.

The data processing unit 1120 comprises a control unit 1122, a quantization processing unit 1124, a combining processing unit 1126, a reconstruction unit 1128, and an authentication unit 1130.

The control unit 1122 controls each of the blocks of the data processing unit 1120 in a centralized manner. The quantization processing unit 1124 converts the partial image acquired by the biometric image acquisition unit 1112 to the quantized image. Also, the quantization processing unit 1124 binarizes the partial image by comparing the shade thereof with the quantizing threshold value. The combining processing unit 1126 mixes a plurality of the quantized images generated by the quantization processing unit 1124 to generate a combined image. While the finger moves on the detection unit 1102, the partial images are acquired at a high sampling period. Hence, the partial images may contain portions overlapping with each other. The combining processing unit 1126 may mix 2 or 3 quantized images corresponding to partial images in proximity to one another to generate one combined image. A more specific method for combining processing will be described in conjunction with FIG. 12 and subsequent figures.

The reconstruction unit 1128 connects a plurality of the combined images generated by the combining processing unit 1126 to generate the entire fingerprint image. The authentication unit 1130 refers to the registered information stored in the registered information storage unit 1144 to determine whether or not the thus generated fingerprint image is similar to the fingerprint image of a registered person to the extent that these images are considered to agree with each other. A known method such as a pattern matching method may be employed as the specific method for the authentication processing.

Next, an algorithm employed in the combining processing unit 1126 for generating the quantized image will be described. Here, two methods including a first method and a second method will be mainly described.

Figure 12:
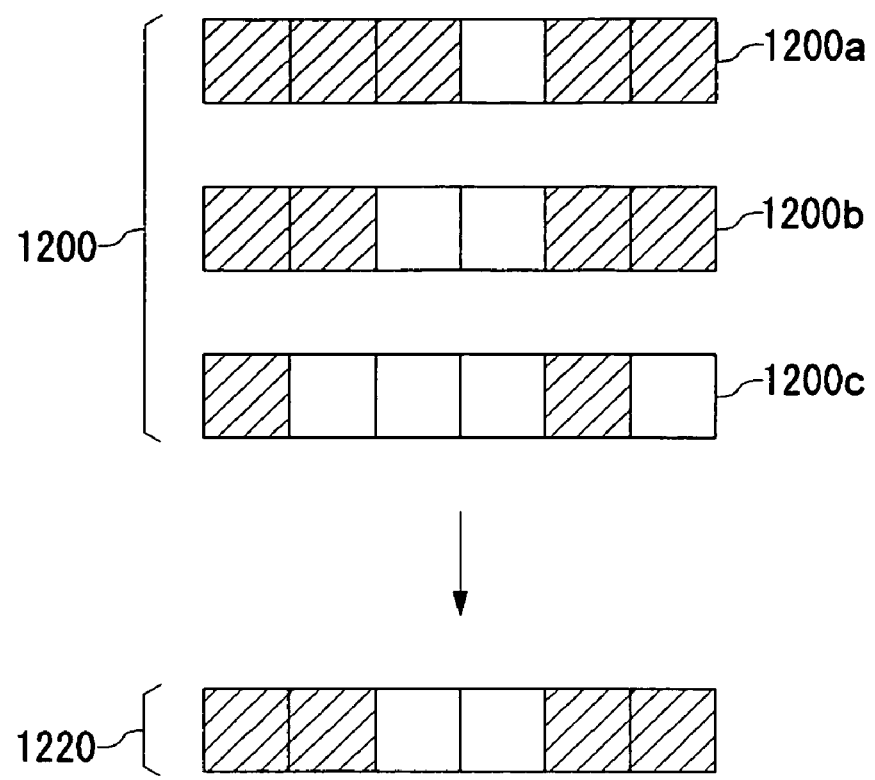
FIG. 12 is a schematic diagram for describing a manner of combining processing of a first method of the second embodiment.

FIG. 12 is a schematic diagram for describing the manner of the combining processing of the first method.

Quantized images 1200*a*, 1200*b*, and 1200*c* in quantized images 1200 are generated by quantizing partial images adjacent to one another. As shown in FIG. 12, a gradation value corresponding to either black or white is assigned to each of the image blocks of the quantized images 1200. In the second embodiment, a description will be given for the case where the quantized images 1200 and a combined image 1220 have a shape formed of image blocks aligned one dimensionally. However, the image blocks may be arranged two-dimensionally.

The biometric image acquisition unit 1112 is assumed to acquire partial images at a period of T. In this case, the quantized images 1200*a*, 1200*b*, and 1200*c* are obtained by quantizing partial images captured at times of nT, (n+1)T, and (n+2)T, respectively (wherein n is a natural number). Here, T is the time obtained by finely dividing the estimated required time for the finger to cross the detection unit 1102. The required time for the finger to cross the detection unit 1102 may be determined through experiment. T is set to a period of time sufficiently shorter than the estimated required time. Thus, the partial images captured at different times have portions overlapping with one another. The partial images captured at times nT, (n+1)T, and (n+2)T are partial images capturing substantially the same part. T is set to such a short period of time.

The quantized images 1200*a*, 1200*b*, and 1200*c* are obtained by quantizing the respective partial images by use of the respective different quantizing threshold values. Among the three quantized images 1200, the quantized image 1200*a* is quantized by use of the highest quantizing threshold value. Thus, the quantized image 1200*a* contains more image blocks to which black is assigned as compared to the quantized images 1200*b* and 1200*c*. Hereinafter, the image block to which black is assigned is also referred to as simply a "black block," and the image block to which white is assigned is also referred to as a "white block." The quantized image 1200*b* is quantized by use of the quantizing threshold value higher than that employed for the quantized image 1200*c*. Thus, the quantized image 1200b contains more black blocks than the quantized image 1200c but less black blocks than the quantized image 1200a.

As such, the quantized images 1200a, 1200b, and 1200c are generated by quantizing the partial images located in close proximity by use of three different quantizing threshold values.

The leftmost image blocks of the quantized images 1200a, 1200b, and 1200c are image blocks in positional correspondence with one another. A set of such image blocks in correspondence with one another in a plurality of the quantized images 1200 is referred to as a "block set."

In FIG. 12, the leftmost block set of the quantized images 1200a, 1200b, and 1200c is a block set containing only black blocks. The leftmost image block of the combined image 1220 is an image block located in a position corresponding to this block set. This image block of the combined image 1220 is referred to as a "corresponding block."

The combining processing unit 1126 determines the gradation values to be assigned to the corresponding blocks of the combined image 1220 according to the gradation values assigned to each of the block sets of the quantized images 1200.

For example, the occurrence number of white blocks in a block set is compared with the occurrence number of black blocks therein, and the gradation value of the image block having the larger occurrence number may be employed as the gradation value of the corresponding block of the combined image 1220. In FIG. 12, all the image blocks contained in the leftmost block set of the quantized images 1200 are the black block. Thus, the corresponding block of the combined image 1220 is the black block. The image blocks contained in the second block set from the left in the quantized images 1200 include two black blocks and one white block. Thus, the corresponding block of the combined image 1220 is the black block. The image blocks contained in the third block set from the left in the quantized images 1200 include one black block and two white blocks. Thus, the corresponding block of the combined image 1220 is the white block. The same procedure is repeated for the other block sets and the other corresponding blocks.

According to such an aspect, the personal authentication apparatus 1100 can generate the suitable combined image 1220 according to a plurality of the quantizing threshold values without dynamically controlling the quantizing threshold value upon the acquisition of a fingerprint image.

Another method may be employed in which black is assigned to the corresponding block of the combined image 1220 if the occurrence number of the black blocks is 1 or more in a block set. As such, the gradation value to be assigned to the corresponding block of the combined image 1220 may be determined provided that the occurrence number of image blocks having a predetermined gradation value is equal to or larger than a predetermined number in a block set.

A still another method may be employed in which, if the average gradation value of a block set is, for example, 0.6, the combining processing unit 1126 determines the gradation value to be assigned to the corresponding block according to this average gradation value. In this case, if the average is, for example, 0.7 or more, 1.0 or white may be assigned to the corresponding block. In the second embodiment, a description is provided for the case where the quantized images 1200 are binarized images. However, a similar description may be provided for quantization by use of three or more levels.

Figure 13:
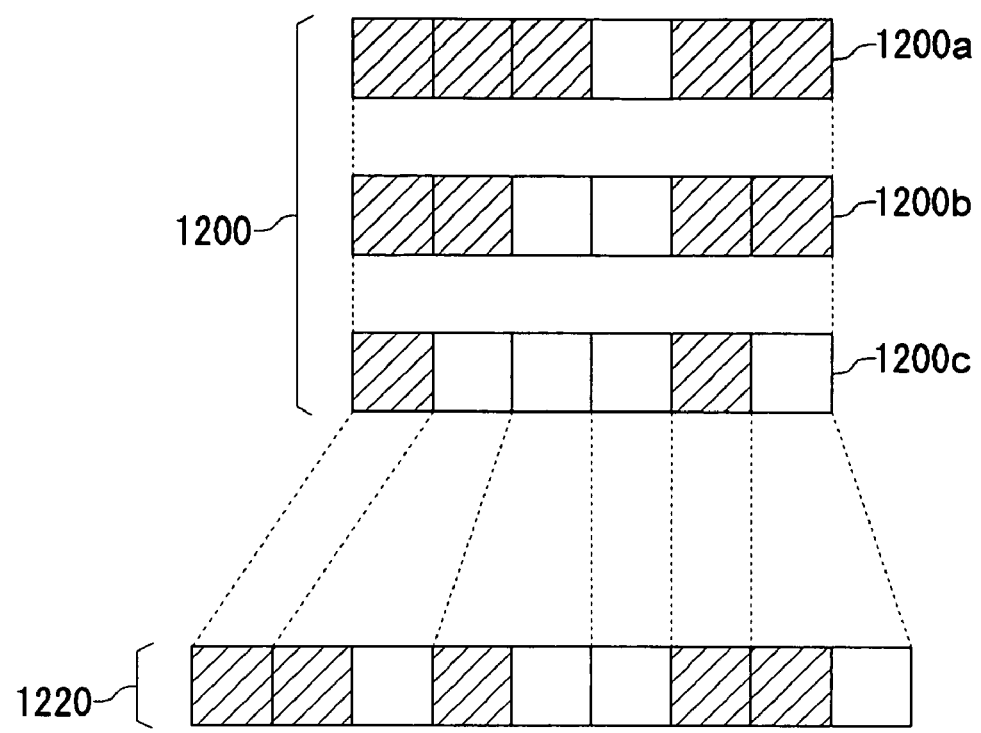
FIG. 13 is a schematic diagram for describing a manner of combining processing in a second method of the second embodiment.

FIG. 13 is a schematic diagram for describing the manner of combining processing of a second method.

The second method is similar to the first method in that the gradation value of the combined image 1220 is determined according to the gradation values assigned to image blocks contained in a block set. In FIG. 13, all the image blocks contained in the leftmost block set of the quantized images 1200 are the black block. Therefore, the corresponding block of the combined image 1220 is the black block. The second block set from the left in the quantized images 1200 contains two black blocks and one white block. In such a case, the combining processing unit 1126 forms a set of image blocks comprising a pair of a black block and a white block, and this set serves as the corresponding block of the combined image 1220. The third block set from the left in the quantized images 1200 contains one black block and two white blocks. Similarly as above, the combining processing unit 1126 forms a set of image blocks comprising a pair of a black block and a white block, and this set serves as the corresponding block of the combined image 1220.

As such, if a block set contains image blocks having different assigned gradation values, the combining processing unit 1126 allows the combined image 1220 to contain a plurality of image blocks according a plurality of the different gradation values. Therefore, if the gradation values are different among a plurality of the quantized images 1200, the combined image 1220 is generated which has a higher resolution reflecting the difference.

Another example may be employed in which, if a block set contains two black blocks and one white block as in the second block set from the left, the corresponding position of the combined image 1220 is allowed to contain two black blocks and one white block. As such, the number of image blocks in the corresponding position of the combined image 1220 may be set according to the occurrence numbers of the gradation values assigned to a block set.

Next, a procedure for capturing a fingerprint image to perform authentication processing will be described by use of a flowchart.

As has been described, the methods for generating a combined image from a fingerprint image include the following method. That is, a plurality of partial images adjacent to one another are quantized by use of different quantization conditions, and the quantized images are combined to form one combined image 1220. In addition to the above, one partial image may be quantized by use of different quantizing threshold values, and the quantized images may be combined to form one combined image 1220.

Hereinbelow, a description will be given for each case.

Figure 14:
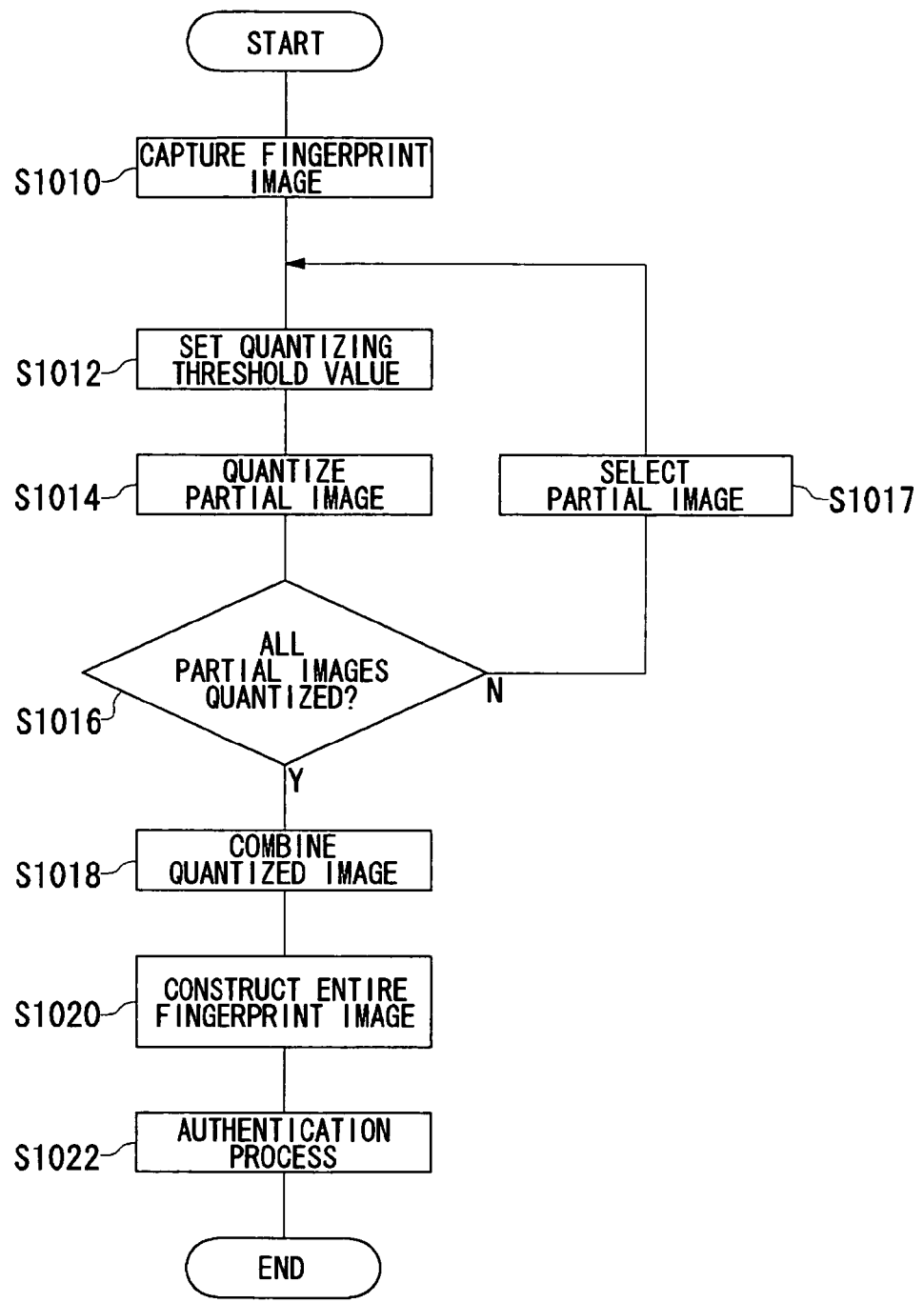
FIG. 14 is an example of a flowchart showing a procedure of capturing a fingerprint image to perform authentication processing in the second embodiment.

FIG. 14 is an example of a flowchart showing a procedure of capturing a fingerprint image to perform authentication processing. Here, a description will be given for the case where partial images adjacent to one another are quantized by use of different quantizing threshold values to generate one combined image 1220.

First, the biometric image acquisition unit 1112 periodically captures a fingerprint image at a sampling period of T (S1010). Thus, a plurality of partial images are acquired. Upon the acquisition of the partial images, the quantization processing unit 1124 sets the quantizing threshold value to a predetermined value (S1012). The quantization processing unit 1124 selects the quantizing threshold value in a predetermined order such as 0.7, 0.5, and 0.3. Here, the quantizing threshold value is set to, for example, 0.7. The quantization processing unit 1124 quantizes the partial image with reference to the set-quantizing threshold value (S1014).

If the quantization is not completed for all the captured partial images (N in S1016), the next partial image is selected (S1017). Then, the same processing is repeated for the newly selected partial image. The quantization processing unit 1124 sets the quantizing threshold value for quantizing the newly selected partial image (S1012). Here, the quantizing threshold value is set to, for example, 0.5. In this manner, each of the partial images is quantized by use of the corresponding set-quantizing threshold value.

Upon completion of the quantization for all the partial images (Y in S1016), the combining processing unit 1126 combines the quantized images 1200 to generate the combined image 1220 (S1018). The generation methods have been described in conjunction with FIGS. 12 and 13. The combining processing unit 1126 selects, for example, the quantized images 1200 including three images adjacent to one another and generates one combined image 1220 therefrom. In such an aspect, the number of the partial images is equal to the number of the quantized images, and the number of the combined images is one-third of the number of the quantized images. The reconstruction unit 1128 connects the combined images 1220 combined for each fingerprint part to thereby generate the entire fingerprint image (S1020). The authentication unit 1130 refers to the registered information of the registered information storage unit 1144 to determine whether or not the features of the fingerprint image acquired from a user is similar to the features of the fingerprint image of a registered person to the extent that these images are considered to agree with each other (S1022). Thus, the authentication processing of a user is achieved.

Figure 15:
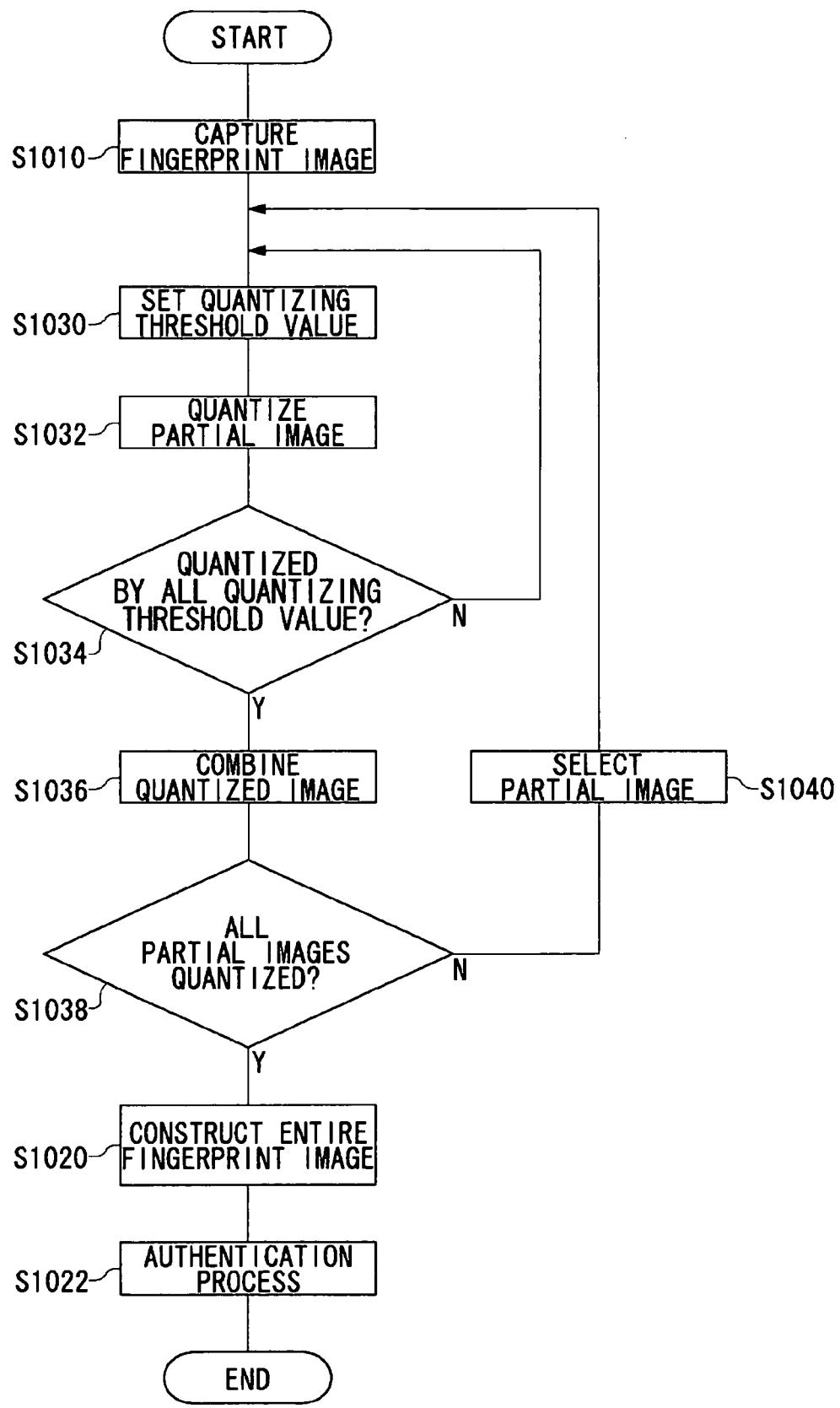
FIG. 15 is another example of a flowchart showing a procedure of capturing a fingerprint image to perform authentication processing in the second embodiment.

FIG. 15 is an example of a flowchart showing a procedure of capturing a fingerprint image to perform authentication processing. Here, a description will be given for the procedure in which one partial image is converted into a plurality of quantized images by use of different quantizing conditions to thereby generate one combined image 1220.

First, the biometric image acquisition unit 1112 periodically captures a fingerprint image at a sampling period of T (S1010). Thus, a plurality of partial images are captured. The quantization processing unit 1124 sets the quantizing threshold value for quantizing the acquired partial image (S1030). The quantization processing unit 1124 selects the quantizing threshold value in a predetermined order such as 0.7, 0.5, and 0.3. Here, the quantizing threshold value is set to, for example, 0.7. The quantization processing unit 1124 quantizes the partial image by use of the set-quantizing threshold value (S1032). For the processing shown here, the quantization processing unit 1124 quantizes one partial image by use of a plurality of the quantizing threshold values. If the quantization is not completed for all the quantizing threshold values, the processing returns to S1030.

The quantization processing unit 1124 set the quantizing threshold value to a value different from that previously employed (S1030). Here, the quantizing threshold value is set to, for example, 0.5. The quantization processing unit 1124 again quantizes the partial image by use of the newly set-quantizing threshold value (S1032). In this manner, a plurality of the quantized images are generated from one partial image by use of a plurality of the quantizing threshold values. Upon completion of the generation of the quantized image for all the quantizing threshold values (Y in S1034), the combining processing unit 1126 combines the quantized images to generate the combined image 1220 (S1036).

If the quantization processing and the combining processing are not completed for all the partial images (N in S1038), the next partial image is selected (S1040). Then, the same processing is followed for the newly selected partial image. In this method, the number of the generated quantized images is larger than that of the partial images. However, the number of the partial images and the number of the combined images eventually become the same.

Upon completion of the quantization for all the partial images (Y in S1038), the reconstruction unit 1128 connects the combined images 1220 for respective fingerprint parts to thereby generate the entire fingerprint image (S1020). The authentication unit 1130 refers to the registered information of the registered information storage unit 1144 to determine whether or not the features of the fingerprint image acquired from a user is similar to the features of the fingerprint image of a registered person to the extent that these images are considered to agree with each other (S1022).

As above, the personal authentication apparatus 1100 has been described according to the second embodiment.

In recent years, a space-saving sensor such as a line sensor has been receiving attention as a device for realizing personal authentication processing in portable type equipment such as a cellular phone. The sensor itself has been being developed which is small, low cost and has a high resolution. On the other hand, particularly, in portable equipment having limited resources such as a CPU and a memory, there has been a demand for a technique for suitably acquiring a biometric image with reducing the processing load for personal authentication as much as possible. A method may be employed in which, during the acquisition of fingerprint images, the quantizing threshold value employed for suitably acquiring the fingerprint image is dynamically controlled. However, such processing has a high processing cost. On the other hand, according to the personal authentication apparatus 1100 shown in the second embodiment, a fingerprint image can be acquired by use of a simple configuration with the effects of the acquisition conditions of the fingerprint mitigated.

In this case, a fixed quantization threshold value is employed. However, correction can be performed with high precision since a determination is made according to substantially a plurality of quantizing threshold values. According to the second method described in conjunction with FIG. 13, the combined image 1220 can be generated with high precision by increasing the number of image blocks according to the distribution of the gradation values in a block set.

The personal authentication apparatus 1100 of the second embodiment quantizes partial images by use of different quantizing threshold values, but the quantizing threshold values are not necessarily different. For example, if an unsuitable partial image is included in partial images adjacent to one another, the effects of the unsuitable partial image can be effectively mitigated by combining at least a plurality of partial images.

Technological ideas which can be derived from the second embodiment and modifications thereof include:

(1) A biometric image acquisition apparatus comprising: a partial image acquisition unit which captures a predetermined human body part as a plurality of partial images; a quantization processing unit which converts the partial image into a quantized image with a plurality of gradation levels; a combining processing unit which mixes a plurality of the quantized images according to predetermined conditions to thereby generate a combined image from these quantized images; and a biometric image generation unit which connects a plurality of the combined images generated for each portion of the human body part to generate the entire biometric image of the human body part.

(2) The biometric image acquisition apparatus as set forth in (1), wherein the quantization processing unit converts the partial image to the quantized image by use of different threshold values, and wherein the combining processing unit mixes the plurality of quantized images quantized by use of the different threshold values to thereby generate the combined image.

(3) The biometric image acquisition apparatus as set forth in (1) or (2), wherein the quantization processing unit assigns a gradation value to each image block serving as a component of the partial image to thereby convert the partial image to the quantized image, and wherein, in a plurality of the image blocks contained in the plurality of quantized images serving as the target of combining processing, the combining processing unit determines, according to the gradation values of the image blocks in positional correspondence with one another in the quantized images, the gradation value of the corresponding image block in the combined image.

(4) The biometric image acquisition apparatus as set forth in (3), wherein, in a plurality of the image blocks contained in the plurality of quantized images serving as the target of the combining processing, the combining processing unit determines, according to the number of the image blocks which are contained in the image blocks in positional correspondence with one another in the quantized images and to which a predetermine gradation value is assigned, the gradation value of the corresponding image block in the combined image.

(5) The biometric image acquisition apparatus as set forth in (3), wherein, in a plurality of the image blocks contained in the plurality of quantized images serving as the target of the combining processing, when the gradation values assigned to the respective image blocks in positional correspondence with one another in the quantized images include a plurality of kinds of values, the combining processing unit allows the corresponding position in the combined image to include a plurality of image blocks to which the plurality of kinds of the gradation values are assigned.

(6) The biometric image acquisition apparatus as set forth in any of (1) to (5), wherein the combining processing unit generates the combined image from the quantized images in correspondence with positions adjacent to one another in the human body part.

(7) The biometric image acquisition apparatus as set forth in any of (1) to (6), wherein the partial image acquisition unit employs a fingerprint as the human body part and acquires line-shaped images as the partial images.

(8) A personal authentication apparatus comprising: a biometric image acquisition unit which acquires a biometric image generated by the biometric image acquisition apparatus as set forth in any of (1) to (7); and an authentication unit which refers to pre-registered biometric information to perform authentication processing for the acquired biometric image.

As above, the present invention has been described with reference to the embodiments. However, the present invention is not limited to the embodiments, and various modifications thereof are also effective as an aspect of the present invention.

What is claimed is:

1. A biometric information processing apparatus comprising:
    an image acquisition unit which acquires a plurality of line-shaped images of a fingerprint by means of a sweep-type sensor for identifying individuals;
    a similarity value calculation unit which calculates a similarity value of a similarity evaluation target by use of an evaluation function for evaluating the similarity between the line-shaped images, the similarity evaluation target containing a first line-shaped image and a second line-shaped image out of the plurality of the line-shaped images, the similarity value representing a degree of similarity between the first line-shaped image and the second line-shaped image;
    a compression unit which compresses the first line-shaped image and the second line-shaped image when the similarity value is equal to or larger than a predetermined threshold value to thereby generate a new line-shaped image;
    a generation unit which combines the newly generated line-shaped image with the other line-shaped images to thereby generate an image of the fingerprint;
    a threshold value determination unit which determines for each line-shaped image the threshold value such that the larger the number of positions where different gradation levels are adjacent each other in a longer direction, the larger the threshold value.

2. The biometric information processing apparatus according to claim 1, wherein
    the compression unit discards, as compression processing, at least one line-shaped image of the first line-shaped image and the second line-shaped image to thereby generate the new line-shaped image.

3. The biometric information processing apparatus according to claim 1, wherein
    the compression unit mixes, as compression processing, data of the first line-shaped image with data of the second line-shaped image at a predetermined ratio to thereby generate the new line-shaped image.

4. The biometric information processing apparatus according to claim 1,
    wherein the line-shaped image is formed of a plurality of block areas aligned in one direction and is image data in which one of a plurality of quantized gradation levels is assigned to each of the block areas,
    the apparatus further comprising:
    a first counting unit which counts a first different position number serving as the number of positions where different gradation levels are adjacent to each other in continuous block areas in the first line-shaped image included in the similarity evaluation target containing the first line-shaped image and the second line-shaped image;
    a second counting unit which counts a second different position number serving as the number of positions where different gradation levels are adjacent to each other in continuous block areas in the second line-shaped image; and
    a difference value calculation unit which calculates a difference value between the first different position number and the second different position number, and
    wherein the similarity value calculation unit calculates the similarity value according to the difference value.

5. The biometric information processing apparatus according to claim 2,
    wherein the line-shaped image is formed of a plurality of block areas aligned in one direction and is image data in which one of a plurality of quantized gradation levels is assigned to each of the block areas,
    the apparatus further comprising:
    a first counting unit which counts a first different position number serving as the number of positions where different gradation levels are adjacent to each other in continuous block areas in the first line-shaped image included in the similarity evaluation target containing the first line-shaped image and the second line-shaped image;
    a second counting unit which counts a second different position number serving as the number of positions where different gradation levels are adjacent to each other in continuous block areas in the second line-shaped image; and a difference value calculation unit which calculates a difference value between the first different position number and the second different position number, and wherein the similarity value calculation unit calculates the similarity value according to the difference value.

6. The biometric information processing apparatus according to claim 3, wherein the line-shaped image is formed of a plurality of block areas aligned in one direction and is image data in which one of a plurality of quantized gradation levels is assigned to each of the block areas, the apparatus further comprising:

a first counting unit which counts a first different position number serving as the number of positions where different gradation levels are adjacent to each other in continuous block areas in the first line-shaped image included in the similarity evaluation target containing the first line-shaped image and the second line-shaped image;

a second counting unit which counts a second different position number serving as the number of positions where different gradation levels are adjacent to each other in continuous block areas in the second line-shaped image; and a difference value calculation unit which calculates a difference value between the first different position number and the second different position number, and wherein the similarity value calculation unit calculates the similarity value according to the difference value.

7. The biometric information processing apparatus according to claim 1, wherein the line-shaped image is formed of a plurality of block areas aligned in one direction and is image data in which one of a plurality of quantized gradation levels is assigned to each of the block areas, the apparatus further comprising a pair counting unit which compares gradation levels of corresponding block areas in the first line-shaped image and the second line-shaped image to thereby count the number of pairs having different gradation levels, and wherein the similarity value calculation unit calculates the similarity value according to the number of pairs having different gradation levels.

8. The biometric information processing apparatus according to claim 2, wherein the line-shaped image is formed of a plurality of block areas aligned in one direction and is image data in which one of a plurality of quantized gradation levels is assigned to each of the block areas, the apparatus further comprising a pair counting unit which compares gradation levels of corresponding block areas in the first line-shaped image and the second line-shaped image to thereby count the number of pairs having different gradation levels, and wherein the similarity value calculation unit calculates the similarity value according to the number of pairs having different gradation levels.

9. The biometric information processing apparatus according to claim 3, wherein the line-shaped image is formed of a plurality of block areas aligned in one direction and is image data in which one of a plurality of quantized gradation levels is assigned to each of the block areas, the apparatus further comprising a pair counting unit which compares gradation levels of corresponding block areas in the first line-shaped image and the second line-shaped image to thereby count the number of pairs having different gradation levels, and wherein the similarity value calculation unit calculates the similarity value according to the number of pairs having different gradation levels.

10. The biometric information processing apparatus according to claim 7, wherein the similarity value calculation unit excludes block areas located in a position where different gradation levels are adjacent to each other in the line-shaped images from the counting of the number of pairs having different gradation levels.

11. The biometric information processing apparatus according to claim 8, wherein the similarity value calculation unit excludes block areas located in a position where different gradation levels are adjacent to each other in the line-shaped images from the counting of the number of pairs having different gradation levels.

12. The biometric information processing apparatus according to claim 9, wherein the similarity value calculation unit excludes block areas located in a position where different gradation levels are adjacent to each other in the line-shaped images from the counting of the number of pairs having different gradation levels.

13. The biometric information processing apparatus according to claim 1, wherein the line-shaped image is image data represented by two gradation levels, the threshold value determination unit increases for each line-shaped image the threshold value such that the larger the number of inversions between black and white occurring in the longer direction, the larger the threshold value.

14. The biometric information processing apparatus according to claim 1, further comprising a low resolution image acquisition unit which acquires a low resolution line-shaped image having a resolution lower than that of the acquired line-shaped image, and wherein the similarity value calculation unit calculates the similarity value by use of the low resolution line-shaped images as a processing target.

15. A biometric information processing method comprising:

acquiring an image of a fingerprint as a plurality of line-shaped images by means of a sweep-type sensor for identifying individuals;

determining a threshold value that serves as a reference for determination as to whether the plurality of line-shaped images are similar;

calculating, by use of an evaluation function for evaluating a degree of similarity between a first line-shaped image and a second line-shaped image which serves as a similarity evaluation target and are included in the plurality of line-shaped images, the degree of similarity between the first line-shaped image and the second line-shaped image as a similarity value;

generating a new line-shaped image by compressing the first line-shaped image and the second line-shaped image when the similarity value is equal to or larger than the threshold value; and combining the new line-shaped image with the line-shaped images excluded from compression to generate an image of the fingerprint, wherein the threshold value is determined for each line-shape image such that the larger the number of positions where different gradation levels are adjacent each other in the longer direction, the larger the threshold value.

* * * * *